United States Patent Office 3,838,084
Patented Sept. 24, 1974

3,838,084
SOLID WATER-SOLUBLE ADHESIVE COMPOSITION IN RELATIVE RIGID FORM COMPRISING ADHESIVE COMPONENT AND NOVEL ISETHIONIC ACID ESTER MATRIX BUILDER
Dwight D. Hutson, Rockville, and Charles A. Rader, Laurel, Md., assignors to The Gillette Company, Santa Monica, Calif.
No Drawing. Filed Sept. 8, 1972, Ser. No. 287,555
Int. Cl. C09j 3/12
U.S. Cl. 260—29.6 Z        22 Claims

ABSTRACT OF THE DISCLOSURE

This invention relates to a coherent, self-sustaining adhesive composition which will resist slumping and change in form at temperatures up to as high as about 50° C. and being adapted to be readily spread upon paper-like surfaces to form an adhesive film thereon by being drawn thereover by light hand applied pressure without crumbling, the adhesive composition being a skeleton structure of interlocked elongated crystals of a matrix builder which is virtually water-insoluble, at room temperature, and is the salt of a compound having the formula RCOO—R'—SO$_3$H, where R is aliphatic having from 7 to 35 carbon atoms and R' is lower alkylene, said skeleton structure forming a matrix for an aqueous medium containing a water-soluble synthetic resin adhesive. This invention also relates to a method for producing the adhesive composition described above which includes the step of forming a mixture of an aqueous solution of a water-soluble adhesive and a matrix builder, the formula of which is given above; heating the mixture to a temperature between that at which a significant amount of the matrix builder dissolves and the boiling point of the compositions; slowing mixing the composition to form a homogeneous slurry or paste without formation of a significant amount of air bubbles; cooling the composition to about a temperature at which the matrix builder is substantially insoluble in water; and curing the matrix builder at between said insolubility temperature and a temperature 15° C. lower than said insolubility temperature.

BACKGROUND OF THE INVENTION

There are many known adhesive compositions on the market for bonding paper and the like together. For the most part, these adhesive compositions are solutions of an adhesive in a solvent, the bonding occurring when the solvent evaporates. This type of adhesive composition has many disadvantages such as a slow bonding time, are generally viscous, draw out in threads, dry on brushes and have other inconveniences attendant their use.

It is therefore an object of the present invention to disclose and provide an adhesive composition which is a relatively solid, self-supporting, and stable cylinder or rod, the end surface of such cylinder or rod being capable of being applied to and spread upon the surfaces of an object at ambient temperatures and with the application of very little force to produce a coating or film to which another surface can be applied and bonded without the use of high pressure or externally applied heat.

Another object of the present invention is to disclose and provide a relatively solid, self-supporting, adhesive composition which can be preformed into a cylinder or rod and which is a skeleton structure of interlocked crystals of a virtually water-insoluble salt of a compound having the formula RCOO—R'SO$_3$, where R is aliphatic having from 7 to 35 carbon atoms and R' is lower alkylene, said skeleton structure forming a matrix for an aqueous medium containing a water-dispersible synthetic resin adhesive.

It is a further object of the present invention to disclose and provide a method for producing a solid adhesive composition which is sufficiently soft and coherent that when applied to a substrate will deform and leave a bonding effective amount of adhesive on said substrate but will not break or crumble.

Another object of the present invention is to embody a method for producing an adhesive solution which is contained in a crystalline matrix to provide a coherent, relatively rigid body.

Still a further object of the present invention is to provide a method for producing a rigid adhesive composition, the adhesive being in activated form and contained in a crystalline matrix, the crystalline matrix being formed of a compound having the formula

RCOO—R'—S$_3$X, where R is aliphatic having from 7 to 35 (preferably 11 to 23 carbon atoms), R' is a lower alkylene, and X is a salt forming anion such as an alkali metal or ammonia.

Still another and further object of the present invention is to disclose and provide a method for providing an adhesive composition having a coherent and relatively rigid form which includes the step of forming an aqueous solution of a water soluble adhesive in combination with a matrix builder having the formula RCOO—R'—SO$_3$X where R, R' and X have the same significances as set forth above, and heating same to between 80° C. and the boling point of the thus formed composition, cooling the thus formed composition to a temperature at which a significant amount of the crystalline solid comes out of solution, holding the temperature at this point until the builder forms a crystalline matrix and then cooling to room temperature.

SUMMARY OF THE INVENTION

The foregoing objects and others are accomplished by the present invention by admixing water, a water-soluble adhesive, and matrix builder which is a salt of the compound RCOO—R'—SO$_3$H where R and R' have the same significances as set forth above, and heating the thus formed composition to a temperature at which at least about 5 percent of the builder (based on the combined weight of the builder, water-soluble adhesive, and water) is soluble in the water and cooling the composition to a temperature at which the builder comes out of solution (2 percent or less of the builder is soluble) and tempering the builder at between this temperature and 15° C. lower until it forms a crystalline structure.

Utilizing the method of the present invention, as set forth above, produces an adhesive composition which has sufficient rigidity to hold its shape but is sufficiently soft to leave the required amount of adhesive on a substrate to form an adequate bond when a slight amount of pressure is applied to the composition. In other words, although the composition is rigid (does not exhibit slump at temperatures up to about 50° C.) and is coherent and semi-rigid at normal temperatures, it is sufficiently plastic to permit it to be rubbed off onto and adhered to paper or other surface by a light hand applied pressure without crumbling or breakage. However, for household and office use, it may be desirable to place the adhesive composition in a casing or dispenser made of synthetic plastic, wax paper or metal (to which the composition does not adhere). The dispenser may be provided with a cover and means for progressively exposing one end of the body of composition therefrom to facilitate application to the substrate to be bonded. Devices of the type used for lipsticks (typified by Pats. 2,395,710; 2,419,526; 2,506,984; and 2,516,938) or casings made of spirally wound waxed or coated papers scored to permit helical removal of an end portion of such casing (as sometimes used on coloring pencils) can be employed for the purpose of handling the composition, shipment, etc. without soiling the hands. The casings or dispensers can be filled with the hot adhesive composition and the composition then cured or tempered in the casing in the manner described above to insure the production of a useful adhesive.

Generally speaking, it can be stated that a solid adhesive composition can be evaluated by measuring certain characteristics which are: rigidity, amount of lay down, ease of application, heel formation and time of bond formation.

The rigidity of the adhesive composition produced by the method of this invention is measured by its penetrometer value which is obtained employing a rack and pinion type of penetrometer (ASTMD 217) equipped with a 15.0 gram aluminum shaft. The penetrometer value is obtained as follows: the temperature of the adhesive composition is stabilized at 72° F., the aluminum shaft is released for five seconds and the length at which the shaft penetrated into the adhesive composition is measured. We have found that penetrometer values of between 2 mm. and about 5 mm. are ideal with the most preferred value being in the 3.5 mm. range.

Bonding time is determined by applying the adhesive composition at a uniform pressure of between 500 and 700 grams to a 3 cm. by 9 cm. area of standard, 60-pound white offset paper. A five-inch wide strip of this paper is placed across the 3 cm. by 9 cm. area and a roller of fixed weight is drawn across the two sheets of paper. The top sheet of paper is then removed at fixed time intervals of 0.5, 1.0, 1.5, 2.0, 3.0 and 5.0 minutes. If a portion of the paper remains bonded, the bond is classified as "partial" and if ¾ or more of the paper remains bonded, it is classified as a "full" bond. We have found that an adhesive composition should give a full bond within five minutes or less and the ideal adhesive composition will give a full bond in three minutes or less.

Lay down in determined by applying a pressure of about 4,000 grams/in.$^2$ to the top of the adhesive composition and moving it across a strip of standard test paper for a distance of 11 inches, after which the adhesive composition is reweighed. The amount of adhesive composition which was "laid down" on the paper can then be determined by weighing the adhesive composition prior to application and after application. We have found that, in general, the average lay down of the adhesive composition should be between 3 to 8 mg. per square inch.

Heel formation is that portion of the adhesive composition that is deformed under application of pressure and movement which remains attached to the adhesive stick. Heel formation is undesirable and is measured by applying a pressure of 4,000 grams/in.$^2$ to the adhesive composition and moving the adhesive composition across a strip of standard test paper for a distance of 11 inches. Any adhesive material which clings to the edge of the composition is the heel and the amount of heel formation is calculated by weighing the adhesive composition with the heel on it and then weighing it after the heel has been removed. Heel formation values should be less than 15 mg. and perferably less than 10 mg.

We have found that we can produce an adhesive composition meeting the above criteria by carefully curing or tempering a composition containing water, a water-soluble adhesive, and a specific kind of matrix builder if the matrix builder is carefully tempered. This tempering or curing step is important and, in addition, only certain types of compounds meet the requirement of a good matrix builder. These matrix builders are salts of compounds having the formula RCOO—R'—SO$_3$H where R and R' have the same significances as set forth above.

Compounds of the above formula are substantially insoluble in water at low temperatures, e.g., room temperature, but are soluble to at least about 5 percent at higher temperatures, e.g. 70° C. or higher. This is important in the present invention because it is essential that the crystalline matrix be insoluble at temperatures at which the adhesive composition of this invention will normally be used but it is also essential that at least 5 percent of the matrix builder be soluble in water at a temperature below the boiling point of water. If the matrix builder was soluble at room temperature, then the adhesive composition would have no rigidity and could not be in solid form.

The method of this invention includes mixing water, the matrix builder, and adhesive and then heating the thus-formed mixture to a temperature at which at least 10 percent of the matrix builder (based on the combined weight of the water and matrix builder) dissolves (e.g. between 80° C. and the boiling point of the solution) and lowering the temperature to the point at which the matrix builder is no longer appreciably soluble in the water (about 2 percent, or less, by weight, of the builder is soluble) and holding the adhesive composition at between this temperature and 15° C. or 20° C. lower until the matrix builder is tempered and then cooling to room temperature.

The manner of mixing is not particularly critical and it is within the scope of the present invention to first heat the water or any of the other ingredients to the desired temperature and then add the other ingredients. It is generally preferred if the water is heated to a temperature of say around 40° C. (i.e. just below the solubility point of the matrix builder) and then the matrix builder added and thereafter adding the water soluble adhesive. After all the ingredients are added the temperature is raised to between that point where at least 5 percent by weight of the builder is soluble and, preferably 10 percent by weight (e.g. 80° C. or 90° C.) and the boiling point of the adhesive composition with mixing. It It is desirable if the mixing is done slowly in order to avoid formation of air bubbles in the adhesive composition. In order to insure a complete lack of air bubbles it is preferred if the adhesive composition is heated to the boiling point and the composition refluxed until all of the air is removed. Thereafter, the composition is lowered to a temperature of between, e.g., 70° C. and 50° C. (i.e. to that temperature where an appreciable amount of the matrix builder comes out of solution) and held there without agitation until the matrix builder is cured or crystallizes sufficiently to produce a final product with a penetrometer value of between 2 and 5.

The tempering step may normally take about 4 to 14 or 16 hours but longer times are not excluded. The prolonged tempering cooling facilitates the formation of a skeleton reinforcing structure in the composition, the skeleton being composed of interlocked elongated crystals of the builder compound, which retains the aqueous adhesive solution.

As has been noted above, the critical components of the adhesive composition are water, a water-soluble adhesive, and a matrix builder of the formula RCOO—R'—SO$_3$X, where R and R' have the same significances as set forth above, and X is an alkali metal such as sodium, lithium, or potassium, or an ammonium ion.

Additionally, the adhesive compositions of this invention may also desirably contain other components such as a water soluble or miscible humectant and/or plasticizer, antifungal preservatives, colorants, fragrances, etc.

The purpose of utilizing a humectant (i.e. a hydroscopic substance) and/or a plasticizer is to prevent loss of moisture, increase the wetting properties of some water-soluble adhesives, and to prevent the dried film of adhesive from becoming brittle and cracking due to internal strain. Exemplary of humectants and/or plasticizers are trihydric alcohols such as glycerol and ethers and esters thereof, glycols such as ethylene glycol and propylene glycol, and monohydric alcohols such as cyclohexyl alcohol.

The antifungal preservatives are utilized in order to increase the shelf life of the adhesive composition. Exemplary of such preservatives which may be added to the adhesive composition of the present invention are the various lower alkyl esters of para-hydroxybenzoic acid such as methyl paraben.

Insofar as water-soluble adhesives are concered which are useful in the present invention, we have found that almost any water-soluble adhesive can be utilized including both natural adhesives and synthetic resin adhesives. Thus, although dextrin, gelatins, animal glues and casein cements can be utilized it is preferred if water-soluble synthetic resin adhesives are utilized. Exemplary of such adhesives are polyvinyl alcohol and polyvinylpyrrolidone. The molecular weight of the resin adhesives is not critical and, for example, in the case of polyvinyl alcohol the molecular weight may vary from say 70,000 upwards to 1,000,000; for polyvinylpyrrolidone the molecular weight range is between 300,000 and 700,000 or 800,000.

Matrix builders which are useful in the present invention are potentially crystalline compounds which are solid and substantially water-insoluble at room temperature but at higher temperatures (above 40° C.) are water soluble in an amount of at least about 5 percent, by weight, based on the combined weight of the water, water-soluble adhesive and matrix builder. Additionally, matrix builders should have a relatively high melting point; at least about 100° C. and preferably above 200° C. Matrix builders which have been found to be useful are salts of compounds having the formula R—COO—R'SO$_3$H, where R and R' have the same significances as set forth above. Preferably, R is an aliphatic group having from 11 to 23 carbon atoms and R' is lower alkylene and preferably has from 1 to 4 carbon atoms, with the preferred amount of carbon atoms being 2. The salts are preferably formed from alkali metals and are preferably sodium, potassium or lithium with sodium being the preferred anion. Additionally, ammonia, either unsubstituted or substituted with lower alkyl groups, can be utilized to good effect as the anion. R is preferably derived from a fatty acid or mixture thereof such as oleic acid, palmitic acid, arachidic, or most preferably, stearic acid.

As has been noted above the adhesive compositions of the present invention may contain auxiliary agents such as humectants, perfumes, etc. However, we have discovered that certain types of impurities sometimes formed during the production of the matrix builders are disadvantageous in that the presence of excess amounts of these impurities often times affects the rigidity of the final composition.

For example, in preparing sodium stearoyl isethionate, sodium stearate, stearic acid, and sodium chloride are normally found as by-products. All three of these by-products, i.e., fatty acid, salt, and fatty acid salt, may be detrimental. We have found, that it is desirable to keep the amount of the salt of the fatty acid and the fatty acid (measured as the free fatty acid) to less than about 4% by weight, based on the weight of the matrix builder, with the preferred amount being less than about 2%, by weight, and the amount of sodium chloride to less than 3%, by weight of the matrix builder, an amount on the order of 0.3% being desirably low.

The amount of the various ingredients of the adhesive composition can vary except that the matrix builder must be present in an amount of at least 5%, based on the combined weight of the matrix builder, water, and water-soluble adhesive. It is preferred if the matrix builder is present in the composition in an amount of from around 10% or 12% to 30%, by weight, based on the weight of the matrix builder, water and water-soluble adhesive. If the matrix builder is present in appreciably greater amounts this sometimes decreases the bond strength and/or increases the bond time of the adhesive. The preferred amount of water in the composition will vary from around 30% to 65%, by weight, based on the combined weight of the water, matrix builder, and water-soluble adhesive. The amount of water-soluble adhesive present will vary from 15% to 45% based on the combined weight of the water-soluble adhesive, water, and matrix builder. If a humectant and/or plasticizer is utilized it is preferred that the amount not exceed 20% by weight based on the weight of the entire composition.

A preferred composition of the present invention would contain 13% to 20% of matrix builder; 20% to 35% of water-soluble adhesive; 10% to 20% of humectant and/or plasticizer; and 20% or 25% to 55% or 60% water, all percentages being by weight based on the entire weight of the composition. It is generally more preferred if the amount of matrix builder varies from 14 to 16%, by weight, based on the weight of the entire composition.

In the following preferred exemplary embodiments all parts and percentages are by weight and all temperatures are given in centigrade.

EXAMPLE I

Fifteen parts by weight of sodium stearoyl isethionate, 25 parts by weight of polyvinylpyrrolidone (average molecular weight about 500,000), 15 parts by weight of glycerol, 0.1 parts by weight of methyl Parasept, and 45 parts by weight of water were mixed together at room temperature and, after all the components were wetted, the mixture was heated to a temperature of between 93° C. and 97° C. Mixing was continued for approximately 2 to 3 hours at a slow rate so as to avoid formation of air bubbles. After that period of time the resulting composition was placed in suitable dispensers and maintained in an oven for between 50 and 60° C. for about 20 hours at which time the composition was allowed to cool to room temperature. The resulting composition met all the criteria of an adequate solid composition given above.

EXAMPLE II

Forty parts by weight of water, 32 parts by weight of polyvinylpyrrolidone, 16 parts by weight of sodium stearoyl isethionate, and 12 parts by weight of glycerol were mixed together and then heated with mixing until the boiling point was reached and the mixture refluxed, with stirring, until all of the air bubbles disappeared. Thereafter, the composition was poured into dispensers (each dispenser held about 8 grams) and held at a temperature of about 60° C. for a period of 15 hours.

EXAMPLE III 49.9 parts by weight of water, 24.0 parts by weight of polyvinylpyrrolidone, 16.0 parts by weight of sodium palmitoyl isethionate, 14.0 parts by weight of glycerol and 0.1 parts by weight of methyl Parasept were mixed together and then heated with mixing until the boiling point was reached and the mixture refluxed, with stirring, until all of the air bubbles disappeared. Thereafter the composition was poured into dispensers and held at a temperatures of about 60° C. for a period of 23 hours.

In the preferred exemplary embodiments given above, certain percentages, water-soluble adhesives, matrix builders, and amounts were given. However, this was done for the purpose of exemplification and the exemplary embodiments should not be considered limiting. Suitable products can be made pursuant to this invention from other esters of isethionic acid, such as myristoyl isethionate and lauroyl isethionate, and from various mixtures of the matrix builders. Minor differences between matrix builders embraced by the class herein disclosed and properties of the water-soluble adhesive component, permit variations in proportions of components and variations in mixing, heating and tempering times.

We claim:
1. A method of producing an adhesive composition in solid, coherent, non-flowable, relative rigid form which comprises:

forming a mixture of water, from 15% to 45%, by weight, of a water-soluble adhesive, and at least 5%, by weight, of a matrix builder which is a potentially crystalline, water insoluble, at room temperature, alkali metal or ammonium salt of a compound having a formula RCOO—R'—$SO_3$H, where R is aliphatic hydrocarbon having from 7 to 35 carbon atoms and R' is lower alkylene;

heating the mixture to a temperature between that in which a significant amount of a matrix builder dissolves and the boiling point of the composition;

slowly mixing the composition without formation of a significant amount of air bubbles;

cooling the composition to about a temperature at which the matrix builder is substantially insoluble in water; and curing the composition at a temperature between insolubility temperature and a temperature 15° C. lower than said insolubility temperature until said composition has a penetrometer value of between 2 mm. and 5 mm. at 72° F.

2. A method according to claim 1 wherein the amount of matrix builder is between 12% and 30%, by weight, based on the weight of the matrix builder, water and water soluble adhesive.

3. A method according to claim 2 wherein the amount of water is between 30% and 65%, by weight, based on the combined weight of the water-soluble adhesive, water, and matrix builder.

4. A method according to claim 1 wherein the matrix builder is an alkali metal or ammonium salt of the stearic acid ester of isethionate.

5. A method according to claim 4 wherein the salt is a member selected from the group consisting of sodium, potassium, lithium and ammonia.

6. A method according to claim 5 wherein the matrix builder is sodium stearoyl isethionate.

7. A method according to claim 1 wherein the water-soluble adhesive is selected from the group consisting of polyvinyl alcohol and polyvinyl pyrrolidone.

8. A method according to claim 7 wherein the water-soluble adhesive is polyvinyl pyrrolidone.

9. A method according to claim 7 wherein the composition consists essentially of from 13 to 20% of matrix builder, 20 to 30% of water-soluble adhesive, and 20 to 60% of water, all percentages being by weight and based on the entire weight of the composition.

10. A method of producing an adhesive composition in solid, coherent, non-flowable, relatively rigid form which comprises:

forming a mixture of from 10% to 30%, by weight, of an alkali metal or ammonium salt of the stearic acid ester of isethionic acid, 30% and 65%, by weight of water, and from 15% to 45%, by weight of water-soluble adhesive;

heating the resulting composition to a temperature between 80° C. and the boiling point and slowly mixing said composition without formation of air bubbles;

cooling the composition to a temperature between 70° C. and 50° C.; and holding the composition at this temperature for at least four hours, thereby forming a solid adhesive composition with a penetrometer value of between 2 mm. and 5 mm. at 72° F.

11. A method according to claim 10 wherein the salt is a member selected from the group consisting of sodium, potassium, lithium and ammonia.

12. A method according to claim 10 wherein the salt is sodium.

13. A method according to claim 10 wherein the water-soluble adhesive is a member selected from the group consisting of polyvinyl alcohol and polyvinyl pyrrolidone.

14. A method according to claim 13 wherein the water-soluble adhesive is polyvinyl pyrrolidone.

15. A method according to claim 13 wherein the adhesive composition contains glycerol.

16. A method according to claim 15 wherein the amount of glycerol is between 10% and 20%, by weight.

17. A coherent, self-sustaining adhesive composition characterized by ability to resist slumping and change in form at temperatures up to about 50° C., having a penetrometer value of between 2 mm. and 5 mm. at 72° F. and being adapted to be readily spread upon paper-like surfaces to form an adhesive film thereon by being drawn thereover by light hand applied pressure without crumbling comprising:

a skeleton structure of interlocked elongated crystals of a virtually water insoluble, at room temperature, alkali metal or ammonium salt of a compound having the formula RCOO—R'—$SO_3$H, where R is aliphatic hydrocarbon having from 7 to 35 carbon atoms and R' is lower alkylene, said skeleton structure forming a matrix for an aqueous medium containing a water-soluble synthetic resin adhesive, said composition containing about 12 to 30%, by weight, of said water insoluble salt, between 15% and 45%, by weight, of adhesive, and between about 30% and 65%, by weight, of water.

18. An adhesive composition according to claim 17 wherein the water insoluble salt is the salt of the stearic acid ester of isethionate.

19. An adhesive composition according to claim 18 wherein the salt is a member selected from the group consisting of sodium, potassium, lithium and ammonia.

20. An adhesive composition according to claim 19 wherein the water insoluble salt is sodium stearoyl isethionate.

21. An adhesive composition according to claim 17 wherein the water-soluble adhesive is a member selected from the group consisting of polyvinyl alcohol and polyvinyl pyrrolidone.

22. An adhesive composition according to claim 21 wherein water-soluble adhesive is polyvinyl pyrrolidone.

References Cited

UNITED STATES PATENTS

| | | | |
|---|---|---|---|
| 3,267,052 | 8/1966 | Brennen | 260—5 |
| 3,539,481 | 6/1968 | Parker | 260—27 |
| 3,186,856 | 6/1965 | Leutzinger | 106—245 |
| 3,576,776 | 4/1971 | Muszik et al. | 260—29.6 |

WILIAM H. SHORT, Primary Examiner

P. F. KULKOSKY, Assistant Examiner

U.S. Cl. X.R.

106—125, 162